United States Patent [19]
Johns

[11] Patent Number: 4,870,772
[45] Date of Patent: Oct. 3, 1989

[54] FLY TYING TOOL

[76] Inventor: Robert R. Johns, 2224 Connes Square, Oxnard, Calif. 93030

[21] Appl. No.: 68,441

[22] Filed: Jul. 1, 1987

[51] Int. Cl.$^4$ .......................... A01K 97/00; D03J 3/00
[52] U.S. Cl. ................................................ 43/1; 43/4; 289/17
[58] Field of Search ............................ 289/17; 43/1, 4

[56] References Cited

U.S. PATENT DOCUMENTS

| | | | |
|---|---|---|---|
| 2,145,439 | 1/1939 | Torrence | 289/17 |
| 2,332,655 | 10/1943 | Miles | 289/17 |
| 2,758,858 | 8/1956 | Smith | 43/1 |
| 2,859,994 | 11/1958 | Whitlinger | 213/43 |
| 2,934,369 | 4/1960 | Kennedy | 289/17 |
| 3,520,566 | 7/1970 | Bovigney | 289/17 |
| 4,184,645 | 1/1980 | Starling | 43/1 |
| 4,417,756 | 11/1983 | Herke | 289/17 |
| 4,462,551 | 7/1984 | Block | 43/1 |
| 4,525,003 | 6/1985 | Tate, Jr. | 289/17 |

FOREIGN PATENT DOCUMENTS 2167931 6/1986 United Kingdom ................. 289/17

Primary Examiner—Nicholas P. Godici
Assistant Examiner—William Scott Andes
Attorney, Agent, or Firm—Marvin E. Jacobs

[57] ABSTRACT

A combination bobbin and knot tying tool has a knot-tying element attached to the bobbin. In one embodiment, the element is secured to the rear of the bobbin. In a second embodiment, the front end of the thread tube of the bobbin is tapered to form a knot-tying element. In another embodiment, the barrel of the tool is slidingly mounted on the thread tube of the bobbin and slides from a retracted position rearward of the tip of the thread tube to a forward position in which the conical end of the barrel with its eye receiving cavity is forward of the tip of the thread tube.

11 Claims, 3 Drawing Sheets

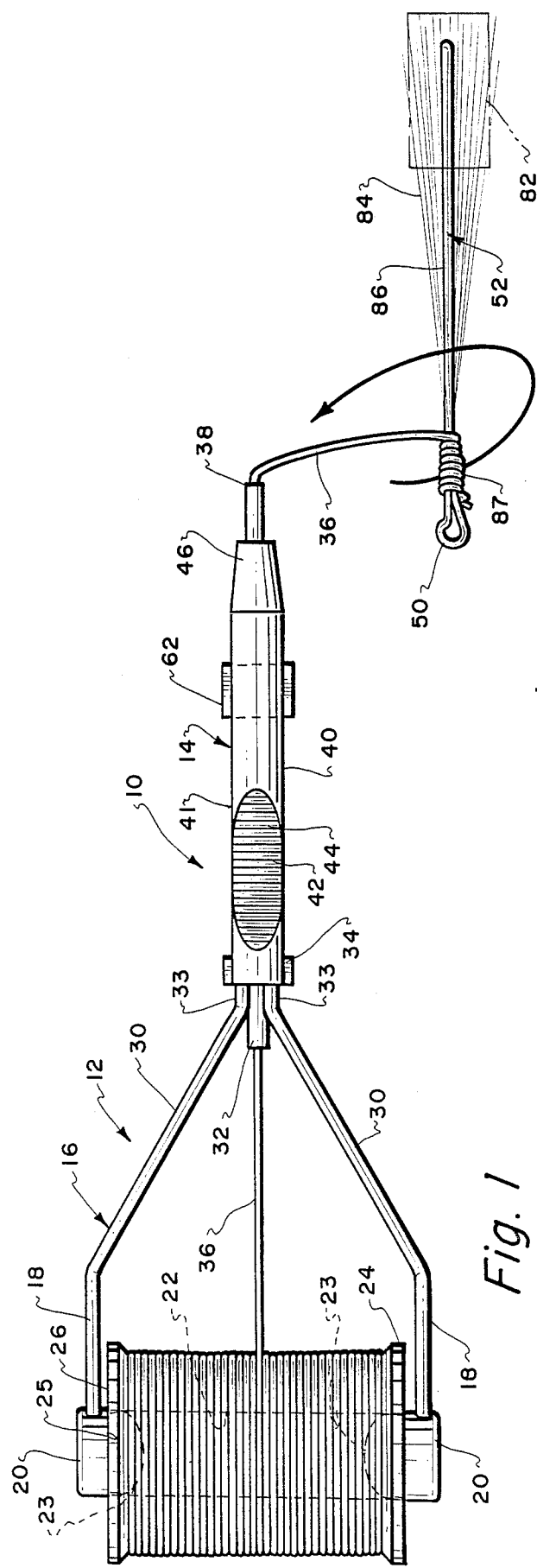
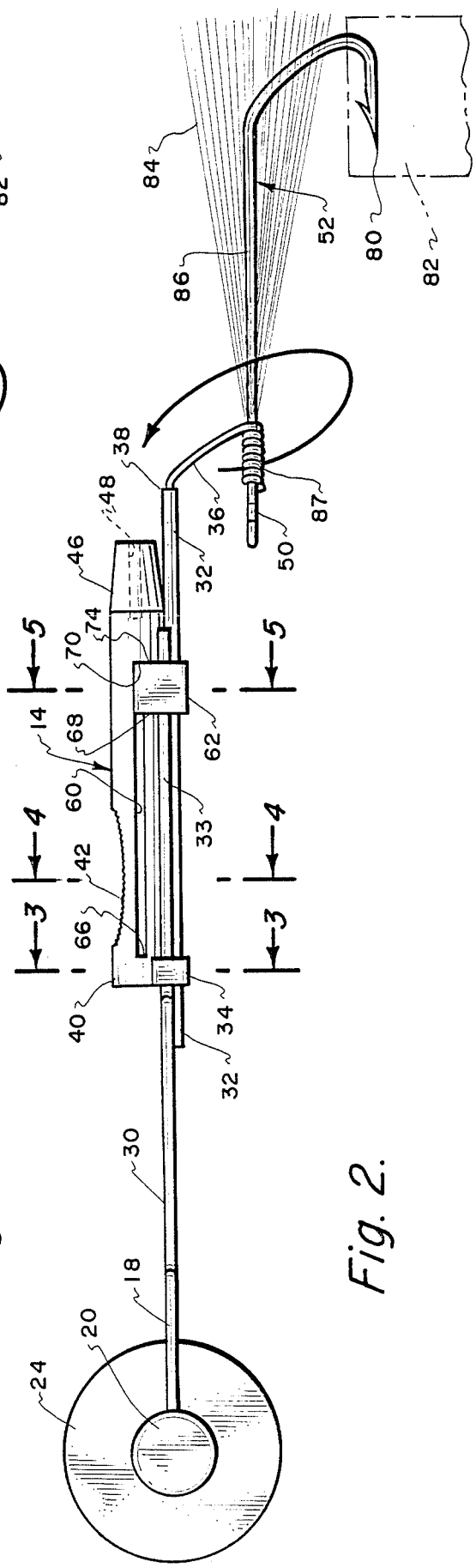

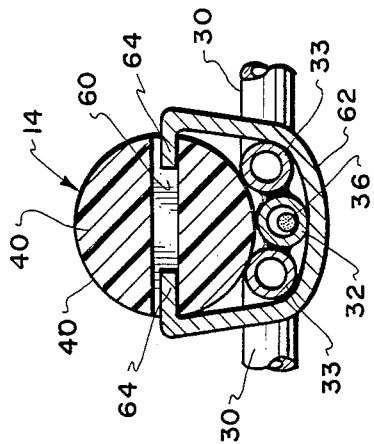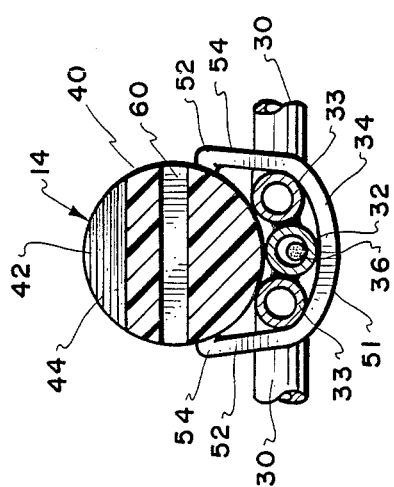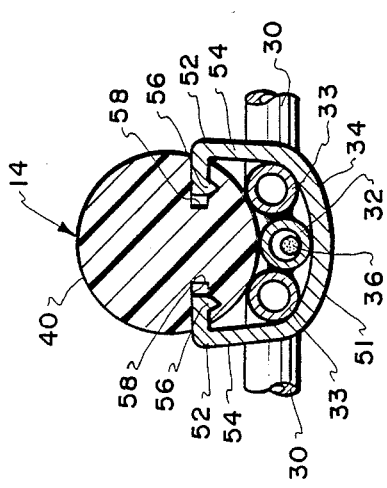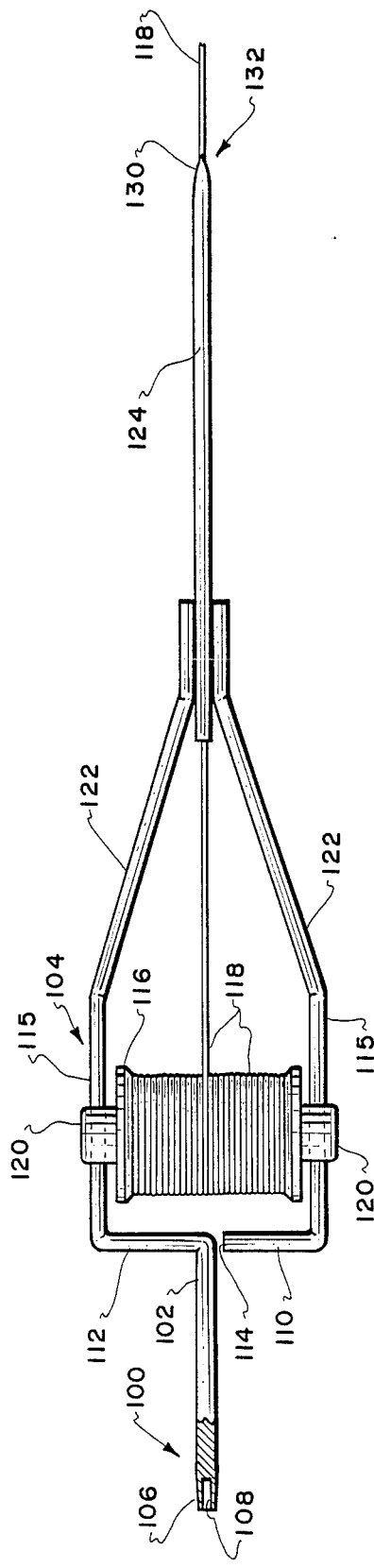

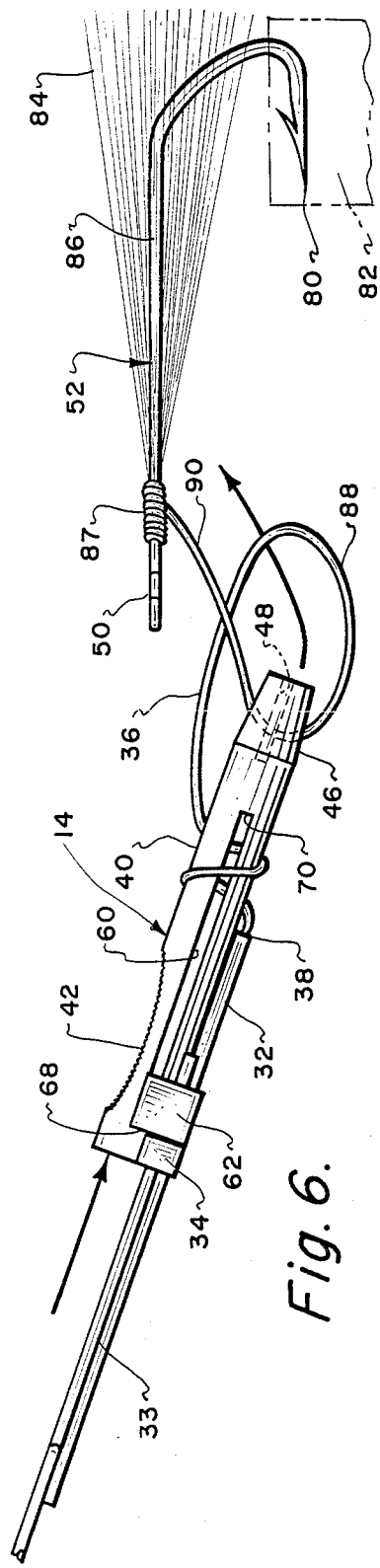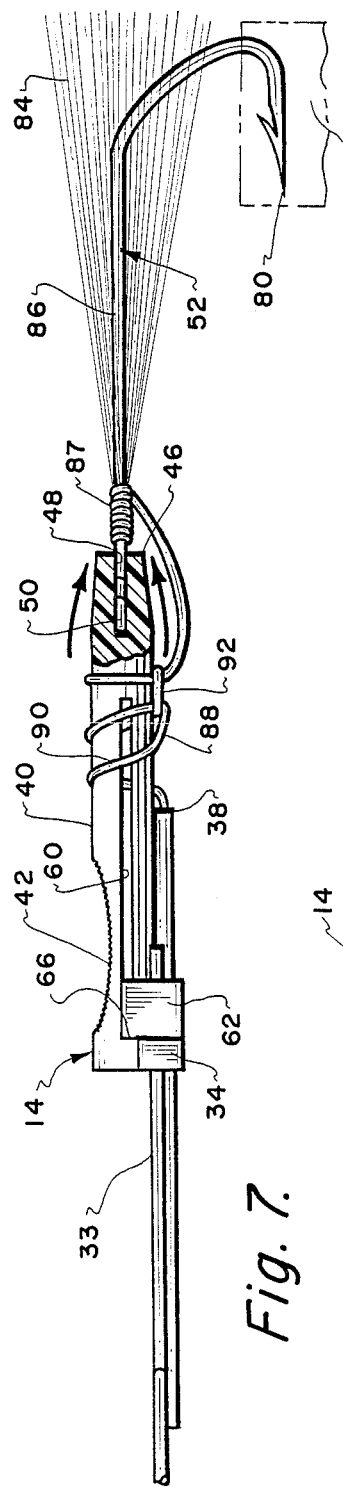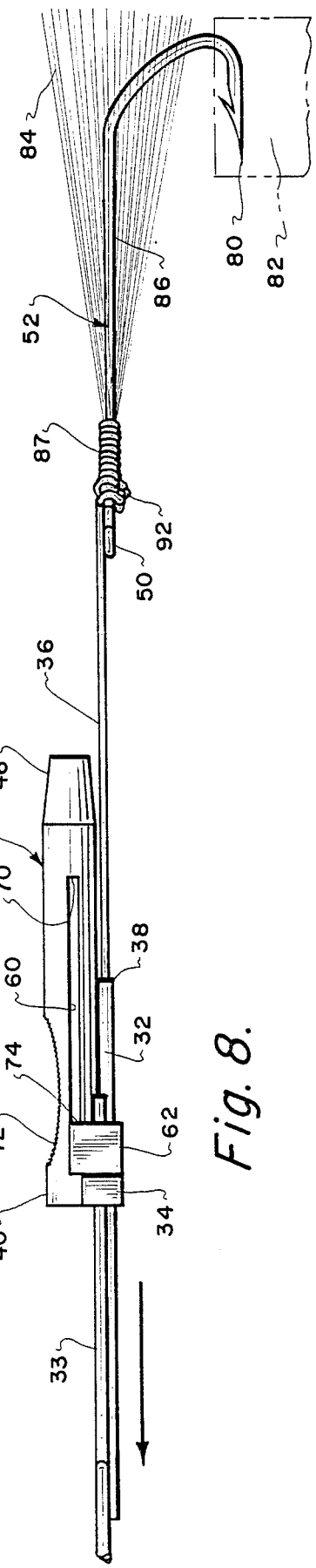

FLY TYING TOOL

TECHNICAL FIELD

The present invention relates to fly fishing and more particularly, this invention relates to an improved tool for tying flies.

BACKGROUND OF THE INVENTION

Fishing, in general, is a rapidly expanding sport and every year more fishermen are converting from bait and spinning to fly-fishing. Fly-fishing offers more of a sport experience than a hunting experience. In fact, many fly fishermen try to avoid harming the hooked fish and return them to the water. Only fish that are so injured that they could not survive in the water are not returned. Not only is skill required in the hooking of fish but many fly fishermen tie their own flies.

The insects which the fish feed upon vary with changes in season, weather, time of day and geographic location. For these reasons and also for reasons of individual preference or whim of the fisherman, the number and variety of patterns and forms of artificial fishing flies carried in the tackle box by an individual fisherman can be extensive. Each fly fisherman carries a plurality of artificial flies in a variety of patterns and forms and each fisherman has his own preference and will argue vehemently about the merits of his favorite artificial fly. As a result, the tying of fishing flies has developed into a considerable business and native art form.

In tying fishing flies, various tools are used and among these is a bobbin-type tool having a pair of flexible legs formed to retain a spool of thread and having a hollow tubular member projecting forwardly from the juncture of the legs. Thread from the spool is passed through the tubular member which is used to feed the thread to a desired location when wrapping feathers, bits of cloth, etc., to secure these items to the hook in a desired manner. To tie the thread off, a knot-positioning tool is used having a forwardly-facing conical barrel with an open cavity. The thread is wrapped around the forward end of the barrel to form a knot. The cavity in the end of the tool is then placed on the eye of the hook and the knot is slid off the tool onto the hook. The thread is then severed, loose ends are trimmed off and the fishing fly is completed. Since fish hooks come in a variety of sizes, it has been necessary to provide a plurality of knot-positioning tools each sized to receive the eye of each different sized fish hook.

Furthermore, in order to switch from the bobbin to the knot-tying tool, it has been necessary to use both hands to operate the bobbin and the knot-tying tool. This requires manual dexterity and coordination and requires substantial experience to attain the necessary skill. Moreover, it is difficult to estimate the precise amount of thread needed to form and position the knot. Therefore, considerable thread is wasted or the knot is not positioned correctly or is not tight enough to hold the fly together.

STATEMENT OF THE INVENTION

An improved fly-tying tool is provided in accordance with the invention which can be operated more easily than the prior tools. The tool of the invention is more convenient and simpler to operate and provides a more reliable tie-off of the thread. The fly-tying operation is completed much more quickly than with the use of the bobbin and knot tying tools previously utilized.

In the fly-tying tool of the invention, the knot tying barrel is mounted on the bobbin in line with the thread carrying tube. When tying is near completion, the conical barrel is translated forward to a position in front of the end of the tube. The tool is then manipulated to wrap a knot on the barrel. The end of the barrel is then placed over the eye of the hook and the knot is slid onto the shank of the hook. The thread is then severed and the barrel retracted into its rearward position.

The barrel can include locking means to lock the barrel in its retracted position and in its forward position. A series of bobbins can be provided, each with a different barrel or the bobbin can be provided with a chuck or threaded mount to engage a plurality of barrels having the same rearward end but a differently sized forward opening designed to slip over different eyes.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is a top view in elevation of the combination fly-tying tool of the invention;

FIG. 2 is a side view in elevation of the tool;

FIG. 3 is a view in section taken along line 3—3 of FIG. 2;

FIG. 4 is a view in section taken along line 4—4 of FIG. 2;

FIG. 5 is a view in section taken along line 5—5 of FIG. 2;

FIG. 6 is a partial view in elevation of the tool with the knot tying barrel in forward position;

FIG. 7 is a partial view of the tool in elevation, partly in section, showing forming the knot on the barrel;

FIG. 8 is another partial view of the tool showing the knot slid onto the shank of the hook of the fly; and FIG. 9 is a top view in elevation of an alternate embodiment of the combination tool with the knot tying element attached to the rear end of the bobbin.

DETAILED DESCRIPTION OF THE INVENTION

Referring now to FIGS. 1 and 2, the combination tool 10 of the invention comprises a bobbin 12 and a knot tying element 14 attached to the bobbin 12. The bobbin is formed of a pair of legs 16 each terminating in parallel sections 18 carrying disc-shaped spool holders 20. A hemispherical stud 23 is mounted on the interior surface of each disc 20. The studs 23 have a diameter adapted to enter the aperture 22 in a spool 24. The disc 20 is slightly larger in diameter than the spool aperture 22 forming a ledge or boss 25 on which the outside surface 26 of the spool 24 rotates.

The legs 16 are bent to form two converging sections 30 which are further bent again to form parallel extensions 33 placed on either side of a thread tube 32 and connected with a band 34 of metal. The bobbin is conventional in construction and use. A spool 24 of thread is inserted in the bobbin by spreading the legs 16 and inserting the hemispherical studs 23 into the apertures 22. A length of thread 36 is unreeled and threaded through the tube 32 until the end emerges through the tip 38.

In the embodiment of the combination tool shown in FIGS. 1-5, the knot-tying element 14 is slidably mounted on the bobbin 12. The element 14 includes a barrel 40 having a retracted position such that the tip 38 of the thread tube 32 is exposed.

The barrel 40 has a rear cylindrical section 41 having an elongated depression 42 with a ridged surface 44 for receiving the thumb of the user. The front section 46 is tapered and has a cavity 48 having a dimension adapted to receive the eye 50 of the hook 52.

The band 34 has a lower curved portion 51 surrounding and in tangential contact with the two extension tubes 33 and the slightly lower thread tube 32. Two side sections 52 and two horizontal tabs 54 having sharp downward facing triangular studs 56 form the sides and top of the band 34. The tabs 54 and studs 56 are received in slots 58 provided in the back of the barrel 40 to lock the band 34 to the barrel to form a unitary assembly.

The band 34 and barrel 40 assembly ride together along the three tubes. The sliding action is further facilitated by means of a horizontal slot 60 provided in the barrel 40. The barrel is mounted to the forward end of the bobbin 12 by means of a second metal band 62. The second band 62 is rigidly attached to the tubes 32, 33. The band 62 has a set of parallel arms 64 which are frictionally received in the slot 60 and act as a guide for the barrel 40. The barrel can be formed of a tough, self-lubricating, engineering plastic such as Teflon (polytetrafluorethylene), Nylon (a polyamide), polyethylene or polypropylene.

The band 62 also acts as a stop for movement of the barrel 40 of knot tying element 14 in either direction. As the barrel 40 slides forwardly, the rearward end 66 of the slot 60 abuts the rearward face 68 of the band 62. In the retracted position, the forward end 70 of the slot 60 abuts the forward surface 74 of the band 62.

Operation of the combination tool of the invention is illustrated in FIGS. 1-8. The barb end 80 of a hook 52 is clamped in the jaws 82 of a vise. Fly-tying proceeds by placing light-weight, fly-tying material 84 such as pieces of fur, feathers, thread and the like along the shank 86 of the hook 52. These materials 84 are secured to the shank 86 and the eye of a looped eye is closed by wrapping filament or thread 36 along the shank 86 adjacent the eye 50 to form a row 87 of tightly wound thread 36 as shown in FIGS. 1 and 2.

When sufficient thread 36 has been wound onto the hook 52, the operator places his thumb in the thumb hold 42 and slides the barrel 40 forward until the tapered end 46 is forward of the tip 38 of the tube 32. The fly-tyer then rotates the tool to wind a first revolution 88 of thread 36 onto the barrel 40 and then forms a reverse loop 90 of thread as shown in FIG. 6. This loop 90 is inserted onto the barrel 40 to form a half-hitch knot 92. The cavity 48 in the tip 46 is then placed on the eye 50 as shown in FIG. 7. The tool is pushed rearwardly to slip the knot 92 off the tip 46 and onto the hook 52. This completes the tie finishing operation.

In the alternative embodiment shown in FIG. 9, the knot forming element 100 is a rod 102 attached to the rear of the bobbin 104. The rod has a tapered end 106 with a cavity 108 for fitting onto the eye of a hook. The rear of the bobbin 102 has two right angle rods 110, 112 that are slit at 114 to permit spreading of the rear legs 115 to permit insertion of a spool 116 of thread 118 onto the hubs 120. The rest of the bobbin has conventional construction comprising the two slanted tubes 122 joined to the thread receiving tube 124.

Another way to provide a knot-tying tool on a bobbin is to provide a taper 130 on the end 132 of the thread tube 124. The tapered portion 130 can be used to tie and slip knots into the eyes of small hooks. The rod 102 can have a different diameter and a larger cavity 108 for use with larger hooks so that one tool can be used with two different sized hooks.

It is to be realized that only preferred embodiments of the invention have been described and that numerous substitutions, modifications and alterations are permissible without departing from the spirit and scope of the invention as defined in the following claims.

I claim:

1. A combination tool for tying flies, comprising in combination:

a bobbin for receiving a spool of thread having a rearward portion on which is mounted a set of aligned spool receiving hubs and a forward portion including a tube for receiving and carrying the thread from the spool and having a forward tip from which the thread extends and is exposed for wrapping about a shank of a fish hook, and a knot tying element including a tubular member having a tapered conical end with a cavity defined therein for receiving an eye on the shank of the fish hook, said tubular member being mounted on said thread tube of said bobbin for sliding movement therealong between (i) a forward position in which said end of said tubular member is displaced forwardly of said forward tip of said thread tube for permitting formation of a knot in the thread solely about said tubular member end and away from the hook shank and (ii) a retracted position in which said tubular member end is displaced rearwardly of said forward tip of said thread tube for permitting removal of the knot formed in the thread from said tubular member end and onto the shank of the hook after the eye on the hook shank has been inserted in said cavity in said tubular member end.

2. A tool according to claim 1 in which the forward portion of the bobbin includes a set of bent legs having a set of parallel rear sections on which the hubs are mounted, two parallel connected front sections and two converging sections connecting the front and rear sections.

3. A tool according to claim 2 in which the thread tube is connected to the front sections of the bobbin.

4. A tool according to claim 3 in which the tip of the thread tube extends forwardly of the forward ends of the front sections of the bobbin.

5. A tool according to claim 3 further including a rear guide element comprising a band member surrounding the thread tube and front sections and connected to the tubular member above the thread tube and front sections for slid able engagement therewith.

6. A tool according to claim 1 in which the tubular member includes a horizontal slot and guide means are mounted on the bobbin having guide elements received in the slot.

7. A tool according to claim 1 in which an arcuate-shaped thumb receiving cavity is formed on the top surface of the barrel.

8. A method to form a fishing fly, comprising the steps of:

stationarily positioning a fish hook with the eye and shank of the hook exposed;

attaching fly-tying material to the shank of the hook by forming loops of thread on the shank of the hook with the thread being supplied from a spool rotatably mounted on a bobbin and received through a thread tube of the bobbin;

positioning the tub ular member of a knot-tying element slidably mounted on the bobbin between an end of the thread tube and the hook;

forming a knot solely on a tapered front end of the tub ular member of the knot typing element and spaced from the hook shank upon disposing of the tubular member at a forward position displaced forwardly of the end of the thread tube;

placing a cavity in the end of the tub ular member of the knot-tying element over said eye on the shank of the hook; and slipping the knot off the tub ular member and onto the shank of the hook upon disposing of the tubular member at a retracted position displaced rearwardly of the end of the thread tube.

9. A combination tool for tying flies, comprising in combination:
- a bobbin for receiving a spool of thread having a rearward portion on which is mounted a set of aligned spool receiving hubs and a forward portion including a tube for receiving and carrying the thread from the spool and having a forward tip from which the thread extends and is exposed for wrapping about a shank of a fish hook, and
- a knot tying element connected to said rearward portion of said bobbin and extending therefrom in a direction opposite to that of said forward portion of said bobbin comprising a right angle rod connected to one of the hubs and extending rearwardly therefrom, said knot tying element having a tapered conical end with a cavity for receiving an eye on the shank of the fish hook for forming a knot solely over the tapered end of said element.

10. The tool according to claim 9 in which the forward portion of the bobbin includes a set of bent legs having a set of parallel rear sections attached to the hubs, two parallel connected front sections and two converging sections connecting the front and rear sections.

11. A combination tool for tying flies, comprising in combination:
- a bobbin for receiving a spool of thread having a rearward portion on which is mounted a set of aligned spool receiving hubs and a forward portion including a tube for receiving and carrying the thread from the spool and having a forward tip from which the thread extends and is exposed for wrapping about a shank of a fish hook, and a set of bent legs having a set of parallel rear sections attached to the hubs, two parallel connecting front sections, and two converging sections connecting the front and rear sections, and
- a knot tying element connected to said rearward portion of said bobbin and extending therefrom in a direction opposite to that of said forward portion of said bobbin, said knot tying element having a tapered conical end with a cavity for receiving an eye on the shank of the fish hook for forming a knot solely over the tapered end of said element.

* * * * *